(12) United States Patent
Mieville et al.

(10) Patent No.: US 10,342,376 B2
(45) Date of Patent: Jul. 9, 2019

(54) BEVERAGE MIXING DEVICE

(71) Applicant: NESTEC S.A., Vevey (CH)

(72) Inventors: Yann Mieville, Pomy (CH); Cedric Beausire, Bavois (CH)

(73) Assignee: Nestec S.A., Vevey (CH)

( * ) Notice: Subject to any disclaimer, the term of this patent is extended or adjusted under 35 U.S.C. 154(b) by 110 days.

(21) Appl. No.: 15/588,185

(22) Filed: May 5, 2017

(65) Prior Publication Data

US 2017/0238754 A1 Aug. 24, 2017

Related U.S. Application Data

(63) Continuation of application No. 14/894,592, filed as application No. PCT/EP2014/059960 on May 15, 2014, now Pat. No. 9,668,605.

(30) Foreign Application Priority Data

May 29, 2013 (EP) .................................... 13169610

(51) Int. Cl.
 *A47J 31/06* (2006.01)
 *A47J 31/10* (2006.01)
 *A47J 31/40* (2006.01)
 *A47J 31/44* (2006.01)
(52) U.S. Cl.
 CPC ........... *A47J 31/404* (2013.01); *A47J 31/401* (2013.01); *A47J 31/4403* (2013.01)

(58) Field of Classification Search
 CPC ...... A47J 31/057–31/0576; A47J 31/06; A47J 31/10–31/12; A47J 31/14; A47J 31/18; A47J 31/40–31/41
 See application file for complete search history.

(56) References Cited

U.S. PATENT DOCUMENTS

| | | | |
|---|---|---|---|
| 3,965,809 A | 6/1976 | Kieldsen et al. | |
| 7,648,049 B1 * | 1/2010 | Lassota ................. | A47J 31/401 222/129.1 |
| 8,579,166 B2 | 11/2013 | Bernhardsgruetter et al. | |
| 8,739,687 B1 * | 6/2014 | Tacklind ................ | A47J 31/42 99/280 |
| 8,950,317 B2 * | 2/2015 | Tanner .................... | A47J 31/46 99/289 R |
| 2009/0236452 A1 * | 9/2009 | Bolognesi ............ | A47J 31/404 241/30 |
| 2010/0086654 A1 | 4/2010 | Douma | |
| 2010/0154644 A1 * | 6/2010 | Skalski ............... | A47J 31/0668 99/275 |
| 2011/0076371 A1 | 3/2011 | Deolarte et al. | |

(Continued)

FOREIGN PATENT DOCUMENTS

CN 1933754 A 3/2007
EP 0843983 A1 * 11/1996

(Continued)

*Primary Examiner* — Michael A Laflame, Jr.
(74) *Attorney, Agent, or Firm* — K&L Gates LLP

(57) ABSTRACT

A beverage production apparatus includes a mixing chamber for producing a beverage from a soluble ingredient and a liquid, and a chamber receiving area for receiving the mixing chamber. The mixing chamber is removable from the chamber receiving area. The chamber receiving area includes an upper part, and the upper part is removable from the beverage production apparatus.

19 Claims, 6 Drawing Sheets

(56) References Cited

U.S. PATENT DOCUMENTS

| | | | | |
|---|---|---|---|---|
| 2012/0006850 A1* | 1/2012 | Bernhardsgruetter | ...................... | A47J 31/404 |
| | | | | 222/129.4 |
| 2012/0121780 A1* | 5/2012 | Lai | ...................... | A47J 31/3623 |
| | | | | 426/433 |
| 2014/0298998 A1 | 10/2014 | Brendle | | |
| 2016/0051081 A1* | 2/2016 | Grassia | ................. | A47J 31/404 |
| | | | | 99/280 |

FOREIGN PATENT DOCUMENTS

| | | |
|---|---|---|
| EP | 0843983 | 5/1998 |
| EP | 1915931 A2 | 4/2008 |
| JP | 2004298418 | 10/2004 |
| JP | 2009022310 | 2/2009 |
| JP | 2009032196 | 2/2009 |
| RU | 2192884 | 11/2002 |
| WO | 2009144239 | 12/2009 |
| WO | 2012049265 | 4/2012 |

\* cited by examiner

BEVERAGE MIXING DEVICE

PRIORITY CLAIM

This application is a continuation of U.S. application Ser. No. 14/894,592 filed Nov. 30, 2015, which is a National Stage of International Application No. PCT/EP14/59960 filed May 15, 2014, which claims priority to European Patent Application No. 13169610.6 filed May 29, 2013, the entire contents of which are incorporated herein by reference.

FIELD OF THE INVENTION

The present invention relates to a beverage production apparatus comprising parts constructed to be dismountable, so that they can be removed from the beverage production apparatus. The present invention also relates to a beverage production method.

From the state of the art (see for example WO 2009/144239 A1) a beverage production apparatus is known, which is configured to produce a beverage by dosing a beverage soluble ingredient and mixing it inside a mixing chamber with a diluent. The mixing chamber can be moved between a mixing position and a dosing position. In the dosing position a dosing unit is operated to provide the dose of the beverage soluble ingredient into the mixing chamber. The movement is controlled by a motor of the dosing unit, and is supported by a slider presenting side grooves, in which corresponding rims on the lateral sides of the mixing chamber can slide. A lever enables the locking of the mixing chamber in the slider. By unlocking the lever and having the mixing chamber slide in the slider until the end of the side grooves, the mixing chamber can be removed from the beverage preparation apparatus, in order to clean it.

However, it has been observed that during beverage preparation in such an apparatus, not only the mixing chamber but also the internal parts of the beverage production apparatus around the mixing chamber are potentially dirtied. In particular, when a dose of the beverage soluble ingredient is introduced into the mixing chamber, powder fines and water projections may escape from the mixing chamber and deposit on the slider and on parts of the beverage production apparatus above the mixing chamber. The deposits on the slider grooves can create residues that block the movement of the mixing chamber in the slider. And even if the mixing chamber is not blocked, at least a thorough cleaning of said parts of the beverage production apparatus around the mixing chamber becomes very difficult.

In view of the above disadvantages, it is an object of the present invention to improve the state of the art. In particular, it is an object of the present invention to provide a beverage production apparatus that can be cleaned easier and more thoroughly. Further, the present invention aims to avoid that a beverage production apparatus has to be returned to maintenance for unblocking the mixing chamber.

The solution to the above-mentioned objects is achieved by the independent claims of the present invention. A general idea of the present invention is thereby to make parts around the mixing chamber dismountable so that they can be removed from the beverage production apparatus. The dependent claims develop further advantages of the present invention.

In particular, the present invention is directed to a beverage production apparatus comprising:

a mixing chamber for producing a beverage from a soluble ingredient and a liquid, and a chamber receiving area for receiving and positioning the mixing chamber in the apparatus, the mixing chamber being removable from the chamber receiving area, wherein the chamber receiving area comprises an upper part, said upper part being removable from the beverage production apparatus.

The present invention allows for an easy removal of the mixing chamber from a beverage production apparatus for cleaning purposes. As an example such a removable chamber is illustrated in WO 2009/144239. According to the present invention, also the internal part of the apparatus around the mixing chamber can be easily removed from the beverage production apparatus. Therefore, said internal part can be comfortably cleaned as well. All removable parts can even be washed in a dish washer or the like.

In the present invention the chamber receiving area corresponds to the hollow space of the apparatus in which the mixing chamber is positioned when the apparatus is ready for operation. The receiving area aims to position and anchor the mixing chamber in the apparatus. The chamber receiving area is defined by internal side walls of the apparatus. The mixing chamber is selectively totally removable from this area, in particular for cleaning.

In the present invention the upper part of the chamber receiving area is also selectively removable from the beverage production apparatus. The upper part of the chamber receiving area corresponds at least to the internal sidewall of the apparatus that is situated above and faces the top opening of the mixing chamber when the chamber is in the apparatus.

Preferably, the chamber receiving area upper part has inserting means for insertion into the beverage production apparatus. When said upper part of the chamber receiving area is inserted into the beverage production apparatus, it is preferably fixed in a way that on the one hand side it cannot slide out of the machine on its own, but on the other hand side it can be easily removed by a user. Preferably the inserting means of the chamber receiving area upper part are rims for sliding within grooves inside the beverage production apparatus.

Preferably the chamber receiving area comprises a slider having receiving means for receiving the mixing chamber. The receiving means can be grooves for slidably receiving rims provided on the mixing chamber. This slider can be actuated to move the mixing chamber inside the beverage production apparatus during the preparation of a beverage.

Preferably, the upper part of the chamber receiving area and the slider comprise cooperating means for sliding the slider in respect to the upper part. Preferably, the cooperating means comprise rims and grooves.

The above-mentioned rim-and-groove solutions provide a simple mechanism for enabling easy insertion and removal of both, the chamber receiving means into and from the beverage production apparatus, and the mixing chamber into and from the chamber receiving means. In both cases, the rims and grooves can be exchanged for another. The materials of the beverage mixing device are preferably plastic materials. The plastic materials are preferably chosen such that they provide enough friction to hold the respective parts in place, but at the same time allow easy insertion and removal by a user.

Preferably, the beverage mixing device further comprises a lever for locking the mixing chamber in the apparatus. The lever can be closed, in order to guarantee that the mixing chamber is secured inside the beverage production apparatus during beverage production. The lever can be opened, in order to slide the mixing chamber all the way out of the chamber receiving area, in order to dismount it. The lever can further be coupled to the functionality of the beverage production apparatus, i.e. a beverage can only be produced if the lever is closed.

All parts of the beverage production apparatus of the present invention that may be contaminated with the soluble beverage ingredient, the liquid or the mixed beverage can be easily dismounted from the apparatus, and can thus be cleaned comfortably and thoroughly.

Preferably, the beverage production apparatus further comprises a dosing unit for delivering a dose of the soluble ingredient from an ingredient container into the mixing chamber. The beverage production apparatus can therefore automatically provide an optimized and constant amount of the beverage soluble ingredient into the mixing chamber, which makes the beverage production process more convenient and more uniform.

Preferably, the beverage production apparatus further comprises a motor for operating the dosing unit. Preferably, the motor is configured to move the slider of the chamber receiving area in respect to the upper part of the chamber receiving area.

Therefore, a single motor is sufficient to operate the dosing unit and to move the mixing chamber. Therefore, the whole mechanism of the beverage production apparatus, and consequently the apparatus itself, can be built more compact.

Preferably, the slider of the chamber receiving area is selectively movable between a beverage production position and a dosing position.

In the dosing position the dosing unit is configured to provide a predetermined amount of the soluble beverage ingredient. In the dosing position preferably no liquid can enter the mixing chamber. In the beverage production position the apparatus is preferably configured to receive the liquid and add it to the soluble ingredient. Preferably, the dosing unit is disconnected from the mixing chamber in this position. The movement between two positions prevents cross contamination between the soluble ingredient and the liquid.

Preferably, when the slider is moved by the motor into the dosing position, the dosing means is opened by the motor. This means particularly, that when the mixing chamber is in the dosing position, a discharge opening of the dosing unit is preferably positioned in accordance with an inlet of the mixing chamber. Such a mechanism for providing the soluble ingredients and the liquid to the mixing chamber, respectively, can be designed in a very compact way.

Preferably, the beverage production apparatus further comprises a current sensing unit for measuring the current of the motor and comparing the measured current with a predetermined threshold value, and a warning unit for issuing a warning signal, when the measured current exceeds the predetermined threshold value.

The measured current corresponds to the force, which the motor has to overcome to move the second part together with the mixing chamber. If said force increases, there is a high likelihood that the guiding means for the movement, which are preferably constructed as rims and grooves, are blocked by residues or other contaminants. To avoid such blockage, the beverage production apparatus is able to provide the user with a warning beforehand. Thus, the beverage production apparatus requires less maintenance.

The present invention will now be described in more detail with respect to the attached drawings.

DETAILED DESCRIPTION

Figure 1:
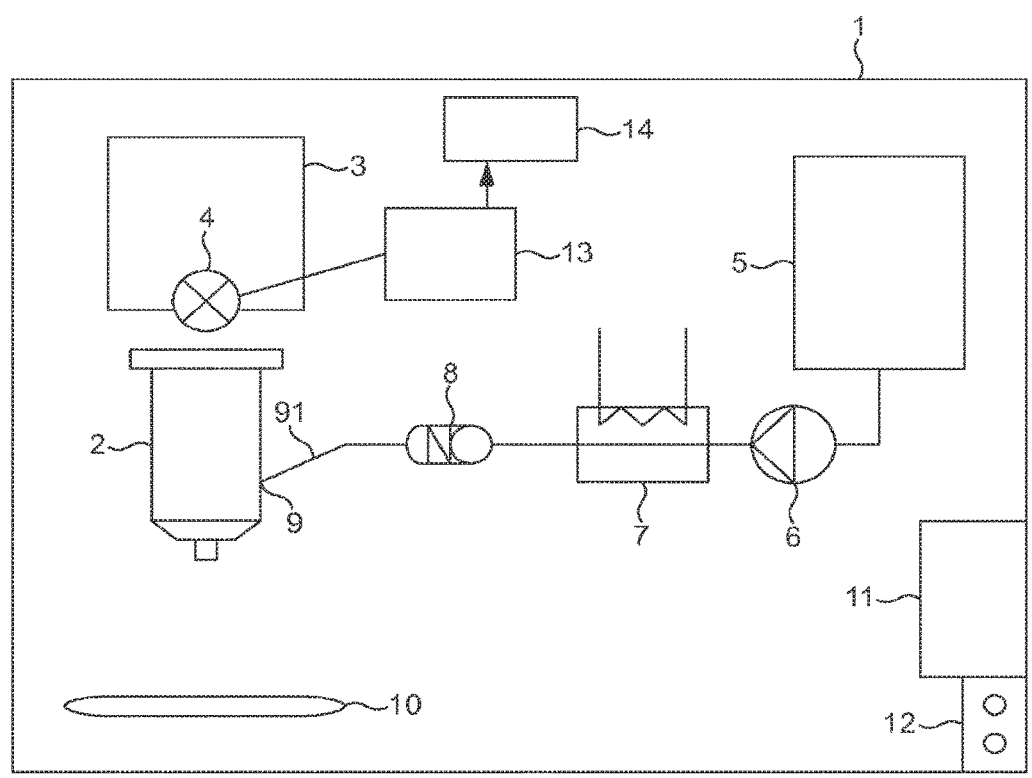
FIG. 1 shows a schematic illustration of a beverage production apparatus of the present invention.

FIG. 1 shows a beverage production apparatus 1 of the present invention. The beverage production apparatus 1 includes a mixing unit 2 comprising a mixing chamber for producing a beverage from a soluble ingredient and a diluent entering the mixing chamber. The beverage production apparatus 1 comprises further a reservoir or a tank 3 for the soluble ingredients, which is placed above the mixing unit 2, and is coupled with the dosing unit 4. The dosing unit 4 has the primary function to meter upon request doses of the ingredient into the mixing unit 2.

The ingredient reservoir 3 can be a hopper, which is permanent or can be a disposable package containing the soluble ingredient. The dosing unit 4 can be any suitable system such as a dosing screw, a reciprocating dosing piston or a rotating disc. Preferably, the dosing unit 4 may be designed like described above or according to WO 2009/144239 A1.

Upon request, the mixing unit 2 is fed with the ingredient from the dosing unit 4. Alternatively, the mixing unit 2 can also be fed manually. The feeding of the mixing unit 2 with the soluble ingredient can be prompted by a control unit 11, for example a micro-controller, and a command unit 12, for example, a user input device. It is to be noted that in the beverage production apparatus 1 the dosing unit 4 and the container 3 are optional.

The beverage production apparatus 1 of the present invention is preferably further provided with a liquid feeding circuit for feeding liquid via a liquid inlet 9 into the mixing chamber of the mixing unit 2, when positioned in the beverage production position. The feeding circuit is preferably provided with a liquid reservoir 5, which can be replenished, for example, with fresh water. Further, the feeding circuit comprises a water pump 6 for transporting the liquid from the reservoir 5 to preferably a water-heating system 7, which can be a thermo block or a cartridge-type heater. Preferably, the feeding circuit is also provided with a non-return valve 8. The pump 6 can be any type of pump, such as a piston pump, a diaphragm pump or a peristaltic pump. A tube 91 is preferably connected to the water inlet 9 of the mixing chamber of the mixing unit 2.

In the beverage production apparatus 1 of the present invention the mixing chamber 21 is preferably placed directly above a service tray 10, onto which a receptacle can be placed to receive a mixed and/or frothed beverage from the mixing chamber 21.

Figure 2:
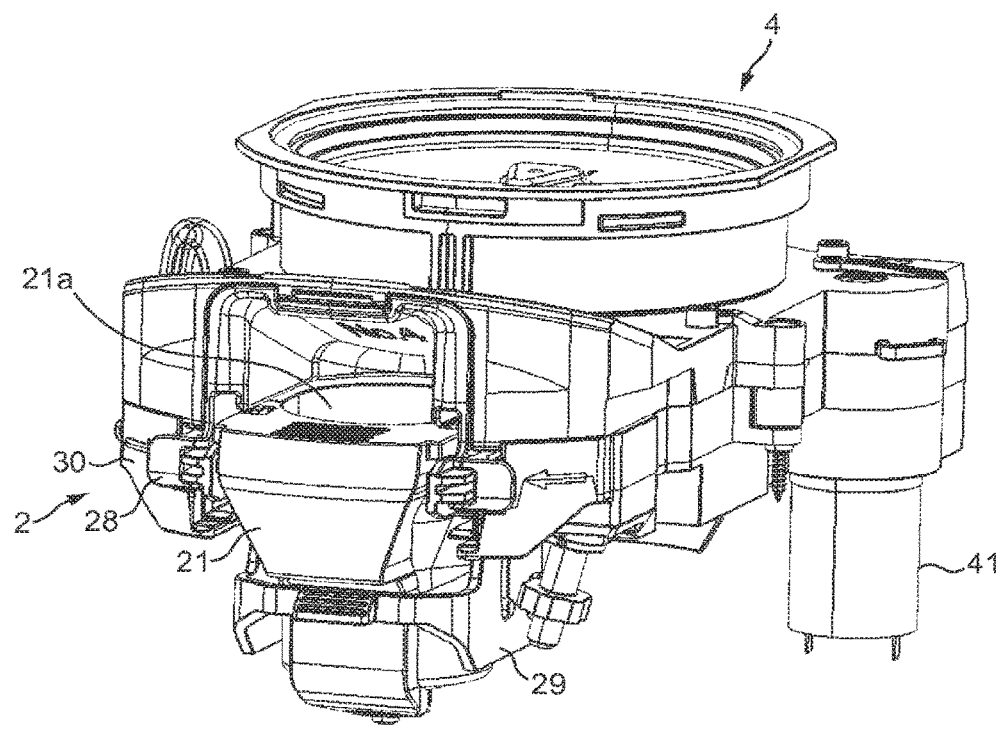
FIG. 2 shows a dosing unit and a beverage mixing unit of a beverage production apparatus of the present invention.

FIG. 2 shows the beverage dosing and mixing units that are inserted into a beverage production apparatus 1 according to the present invention.

The dosing unit 4 is preferably configured to receive a beverage soluble ingredient from an ingredient tank or ingredient container 3 of the apparatus 1, which is preferably placed onto the dosing unit 4. The dosing unit 4 is preferably equipped with a motor 41. When the motor 41 is operated, the dosing unit 4 is preferably designed to rotate and thereby open or close a discharge aperture 45 (see FIG. 8) through which a dose of the soluble ingredient is discharged. The dosing unit 4 can be designed like the dosing device described and claimed in WO 2009/144239 A1 or as explained below in more detail.

The beverage mixing unit 2 shown in FIG. 2 comprises a mixing chamber 21, which is suitable for receiving the dose of the soluble ingredient provided by the dosing unit 4, and which is further suitable for receiving a liquid, in order to mix and optionally froth a beverage. The chamber presents a top opening 21a through which the dosing unit 4 can introduce a dose of beverage ingredient. The liquid is preferably received from a water tank 5 of the apparatus 1 via a liquid feeding circuit.

Figure 3:
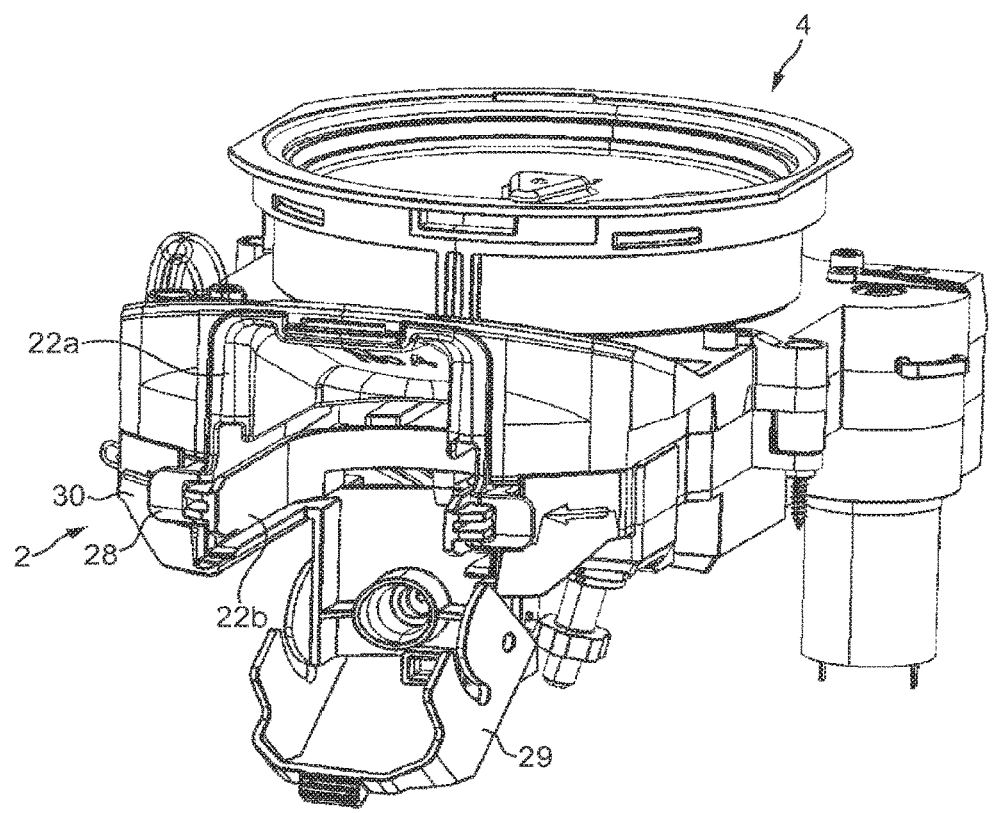
FIG. 3 shows the dosing unit and the beverage mixing unit from which the mixing chamber has been removed

The beverage mixing unit 2 further comprises a chamber receiving area 22 (particularly illustrated in FIG. 4), which is configured for receiving and surrounding the mixing chamber 21. FIG. 2 shows further a lever 29, which can be operated by a user of the apparatus 1, in order to selectively lock the mixing chamber 21 in the chamber receiving area 22 or unlock the mixing chamber 21 so that it can be removed from the chamber receiving area 22. FIG. 3 shows the beverage mixing unit 2 in a state where the mixing chamber 21 has been removed from the chamber receiving area and making apparent the chamber-receiving area 22, which surrounds the mixing chamber 21 during beverage production.

Figure 4:
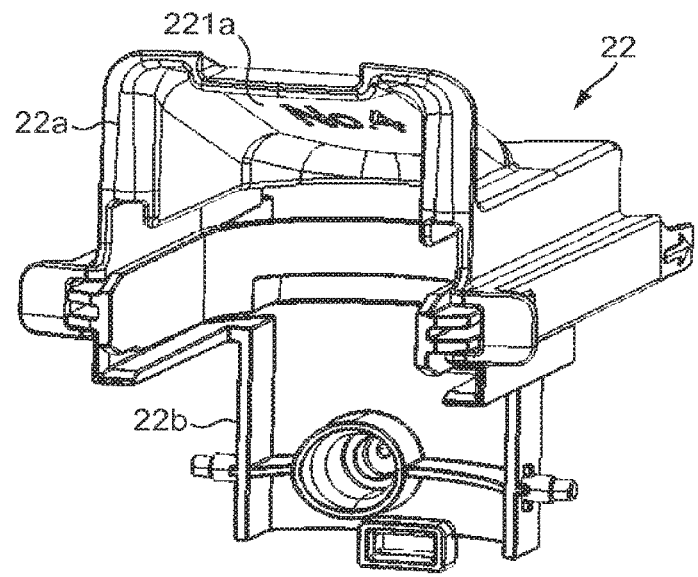
FIG. 4 shows an isolated view of the chamber-receiving area of a beverage production apparatus of the present invention.
Figure 5:
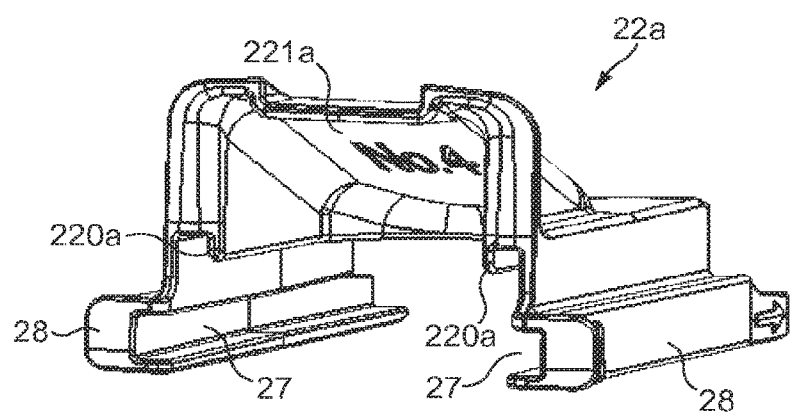
FIG. 5 is an isolated view of upper part of the chamber-receiving area of FIG. 4.

FIG. 4 shows and isolated view of the chamber-receiving area 22 taken out of the view of FIG. 3. The chamber receiving area 22 comprises two parts 22a, 22b. The upper part 22a of the chamber-receiving area is designed so as to extend above and around the top opening 21a of the mixing chamber. This upper part 22a comprises wall According to the invention the upper part 22a of the chamber-receiving area is removable from the beverage production apparatus 1 once the mixing chamber has been removed from the chamber receiving area. It is equipped with means for inserting it into the beverage production apparatus 1. In FIG. 5 these inserting means are designed as two rims 28, which are respectively provided on the two lateral external sides of the chamber receiving area upper part 22a. The rims 28 can slide into grooves 30 provided inside the body of the beverage production apparatus 1 as shown in the FIGS. 2 and 3, respectively. Each lateral side can also be provided with more than one rim 28. Alternatively, grooves can be provided in the chamber receiving area upper part 22a, and corresponding rims can be provided in the beverage production apparatus 1. Other equivalent means for enabling an easy insertion and removal of the chamber receiving area upper part 22a into and from the beverage production apparatus 1 are also possible.

When the upper part 22a of the chamber-receiving area is inserted into the beverage production apparatus 1, it is preferably fixed inside the apparatus 1. Preferably, the upper part 22a is fixed at least by friction of the above-mentioned rims 28 and the grooves 30 within the apparatus 1. To this end, the upper part 22a can be dimensioned such that the rims 28 on the two lateral sides of the upper part 22a fit into the opposite grooves 30 within the beverage production apparatus 1, so that when they are inserted completely, a sufficient amount of force is required to slide it back out. The insertion means can also be provided with some kind of snap mechanism and/or with a ratchet, which cooperates with corresponding means in the beverage preparation apparatus 1, in order to provide the fixation. The outer surface area of the upper side is in contact with the inside of the apparatus 1 body, when the upper part 22a of the chamber receiving area is inserted. This provides additional friction for fixing the upper part 22a in the apparatus.

As illustrated in FIG. 5 the upper part 22a preferably presents a shape such that any drop or mist of liquid (beverage or diluent) raising above the chamber during the preparation of a beverage and settling or condensing on the upper part surface is lead to slide along the surface of the upper part and is guided back inside the mixing chamber opening 21a. According to the preferred embodiment the upper part 22a presents an internal top surface 221a that is at least partly downwardly tilted in direction of the chamber opening 21a. The tilted upper side of the upper part 22a forms a cavity above the mixing chamber 21 when it is inserted into the chamber receiving area 22. Preferably the tilted part is in the back whereas the front part of the upper part 22a remains opened (back referring to the internal part of the apparatus, whereas front referring to the external part of the apparatus). Then the upper part forms a cavity that facilitates removal of the upper part 22 by a user introducing his fingers in the cavity. The upper side of the upper part 22a can therefore also have a kind of grip or dedicated pulling area.

Preferably the bottoms 220a of the lateral sides of the upper part of the chamber-receiving area define a surface that is smaller than the top surface of the mixing chamber 21. Consequently no drop of liquid can fall on the lateral sides of the mixing chamber 21 and in the rims and grooves 26 and 27 or 24 and 25 which could rapidly lead to the blocking of the chamber movement.

The beverage mixing unit 2 further comprises a slider 22b for receiving the mixing chamber 21. This second part 22b of the chamber receiving area is movable in respect to the upper part 22a. That means, when the upper part 22a is fixed inside the beverage preparation apparatus 1, the slider 22b is movable inside the beverage preparation apparatus 1. As shown in FIG. 4, the movement of the slider 22b relative to the upper part 22a is made possible by cooperating means between the two parts of the receiving area 22, which are, for example, two or more rims 26 provided respectively on the two lateral external sides of the slide 22b, which can slide in two or more grooves 27 respectively provided on the inside of the upper part 22. Contrary to the grooves 30 and rims 28 between the upper part 22a and the apparatus, the grooves 27 and rims 26 shall not be fixed e.g. by friction so that the slider is free to move back and forth inside the grooves 27.

Figure 6:
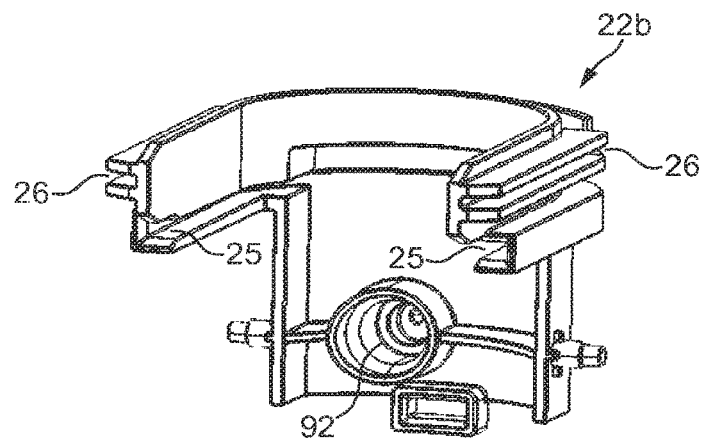
FIG. 6 is an isolated view of the slider of the chamber-receiving area of FIG. 4.
Figure 7:
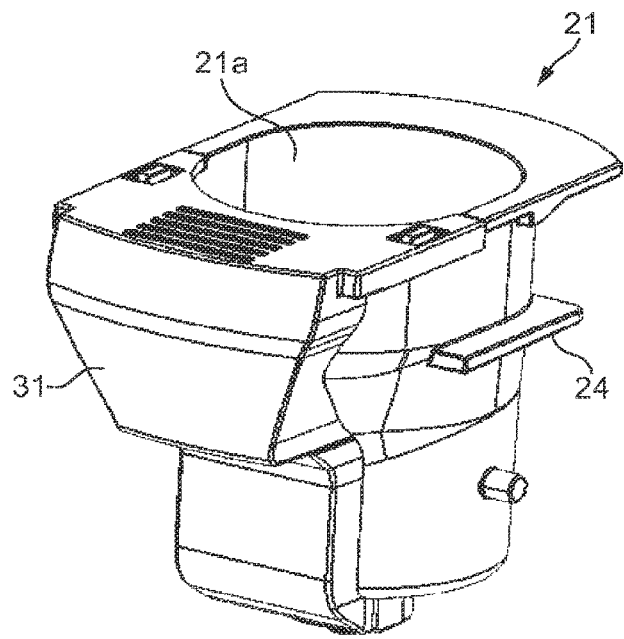
FIG. 7 is an isolated view of the chamber removed from the receiving area of FIG. 4.

The slider 22b of the chamber-receiving is further equipped with means for receiving the mixing chamber 21. As shown in FIG. 6, these means can be realized by grooves 25, which are provided on opposite inner sides and are designed to cooperate with the rims 24 on the lateral external sides of the mixing chamber 21 as shown in FIG. 7. The rims 24 of the mixing chamber 21 can slide in the grooves 25 of the slider 22b. Again, the rims 24 and grooves 25 can be exchanged with another, so that the mixing chamber 21 may be provided with grooves, whereas the slider 22b of the chamber receiving area 22 may be provided with rims. The slider 22b comprises a diluent inlet 92 that cooperates with the diluent inlet 9 of the mixing chamber and established the connection with the diluent supply.

The mixing chamber 21 shown in FIG. 7 can be inserted into the chamber receiving 15 area 22 of the mixing unit 2 of FIG. 3, and can be locked with the above-described lever 29. When the mixing chamber 21 is inserted into the chamber receiving area 22, it is supported by the slider 22b. The relative movement of the slider 22b in respect to the upper part 22a, which is fixed inside the beverage production apparatus 1, is laid out such that the mixing chamber 21 supported by the slider 22b can be moved from a mixing position into a dosing position. In the dosing position the mixing chamber 21 is positioned such that when the dosing unit 4 provides a dose of the soluble ingredient, the dose is received by the mixing chamber 21. In the beverage production position the mixing chamber 21 is preferably positioned distanced from the dosing unit 4, in order to receive the liquid or other diluent separately from the soluble ingredients. The mixing chamber 21 is provided with a liquid inlet and optionally with mixing and/or frothing means for mixing and/or frothing a beverage. The mixing chamber is preferably further provided with a grip like structure 31 on its outer surface, in order to facilitate its removal from the apparatus 1 by the user. The grip like structure may be designed to work together with the lever 29.

Figure 8:
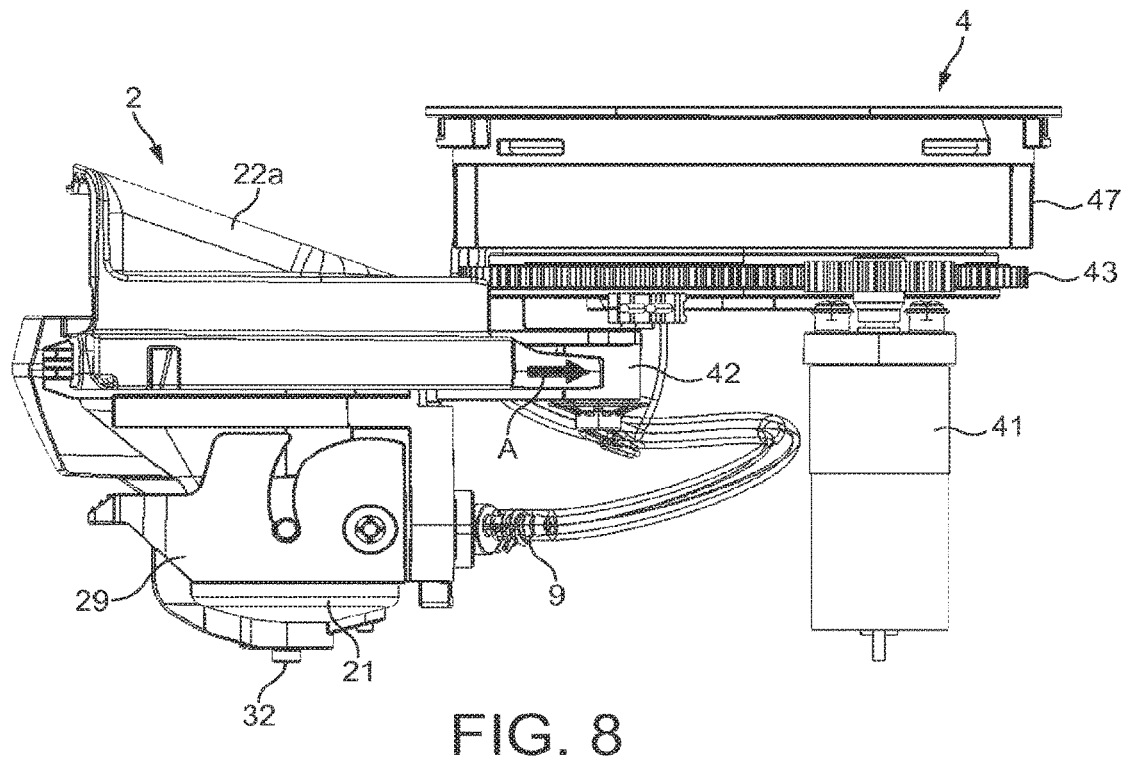
FIG. 8 shows a side view of the dosing unit and the beverage mixing device of the beverage production apparatus of the present invention.
Figure 10:
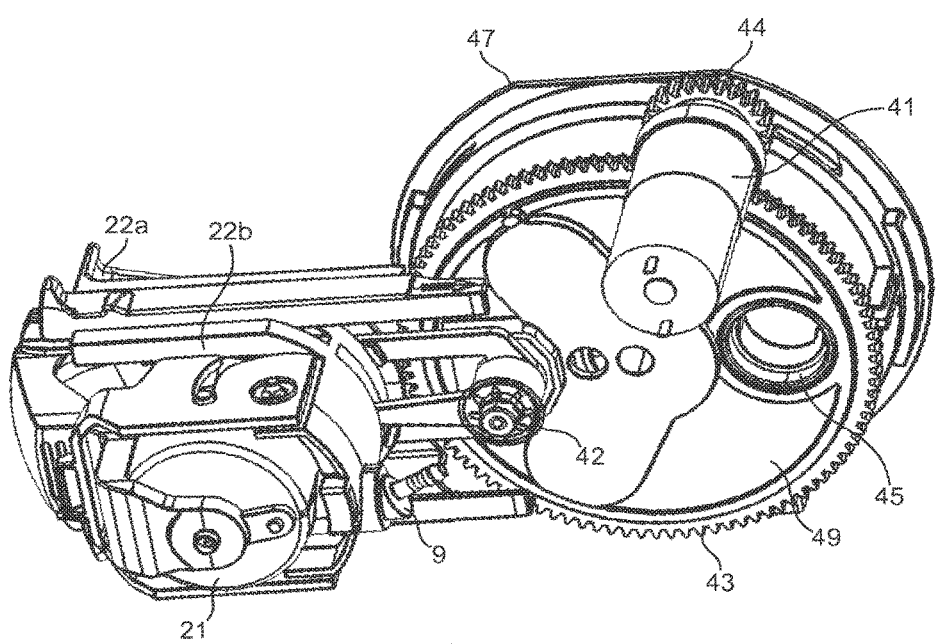
FIG. 10 shows a bottom perspective view of the dosing unit and the beverage mixing device of the beverage production apparatus of the present invention.

FIG. 8 shows side view of the beverage mixing and dosing units 2, 4. FIG. 8 shows the mixing chamber 21 in a beverage production position. In this position the liquid can be inserted via a liquid inlet 9 into the mixing chamber 21 which creates a jet that mixes and froths the beverage in the mixing chamber 21. The mixing chamber 21 is also provided with an outlet 32 for outputting the produced beverage. The arrow in FIG. 8 shows the movement of the slider 22b of the chamber-receiving area 22, together with the mixing chamber 21 in respect to the fixed upper part 22a when a dosing operation starts. The arrow A shows the direction, along which the mixing chamber 21 can be moved while it is supported by the slider 22b. The mixing chamber 21 can be moved into a dosing position, in which it can receive a dose of the soluble ingredient from the dosing unit 4. The movement from the mixing position to the dosing position is caused by the motor 41 of the dosing unit 4. In particular, the motor 41 preferably rotates a gear wheel 43 of the dosing unit 4, which again acts on means 42, which translate the rotation into a translational relative movement of the slider 22b in respect to the upper part 22a. Thereby, also the mixing unit 21 is moved. The means 42 can be designed as a connecting rod, which connects the movable slider 22b with the gear wheel 43 and comprises a rotatable extremity that is attached to the gear wheel 43. When the gear wheel 43 is rotated, the connecting rod 42 pulls the second part 23 and the mixing chamber in direction of the dosing unit 4. As shown in FIG. 10 the connecting rod 42 is preferably positioned within a notch provided in the slider 22b, so that it can swivel while its rotatable extremity rotates, in order to follow the rotational movement of the gear wheel 43.

The gear mechanism of the dosing unit 4 is preferably configured such, that when the motor 41 is operated to rotate the gear wheel 43, the mixing chamber 21 supported by the slider 22b is moved from the beverage production position to the dosing position, while at the same time the dosing unit 4 is rotated to its open state, for example, as described in WO 2009/144239 A1. That means that the motor 41 of the dosing unit is preferably used for rotating the dosing unit 4 and indirectly for translating the mixing chamber 21 via the slider 22b.

Figure 9:
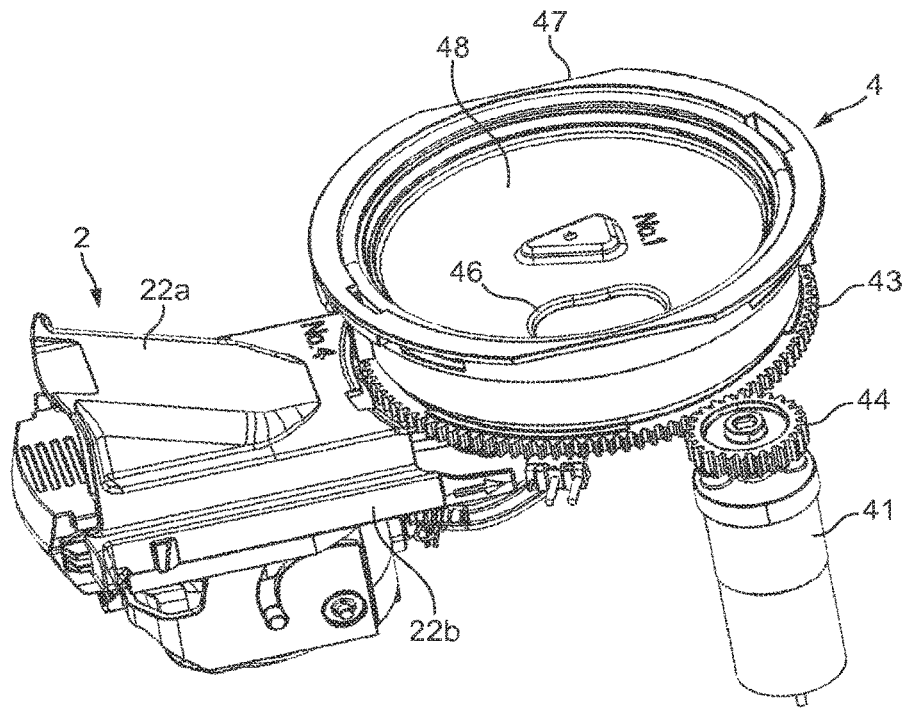
FIG. 9 shows a top perspective view of the dosing unit and the beverage mixing device of the beverage production apparatus of the present invention.

FIGS. 9 and 10 show perspective top and bottom views of the beverage mixing unit 2 and of the dosing unit 4. It can be seen that a gear wheel 44 is rotated, when the motor 41 is operated, and the gear wheel 44 rotates the gear wheel 43 with which it is engaged. By means of rotating the gear wheel 43, the dosing unit 4 is rotated such that an opening 45 is opened. Further, the rotation of the gear wheel 43 causes a translational movement of the slider 22b, due to the means 42 described above. Thereby, the mixing chamber 21 is brought into its dosing position, in which the opening 45 of the dosing unit 4 emerges in a mixing chamber inlet. To the contrary, in the beverage production position, the opening 45 is firstly closed, and secondly distanced from the mixing chamber 21.

Preferably, the dosing unit 4 comprises a body 47 made of at least a disc presenting a single aperture. Further, a rotary top disc 48 is preferably disposed on the top of the fixed body 47, and presents an aperture 46 used for receiving the soluble ingredients from the ingredient container 3 cooperating with rotary top disc 48. The dosing unit 4 further comprises a rotary bottom disc 49, which is disposed on the bottom of the body 47 and presents the aperture 45 used for discharging a dose of the soluble ingredients into the mixing chamber 21. The dosing unit further has a rotary shaft connecting the bottom disc 49 and the top disc 48 and allowing rotation in respect to each other.

Coming back to FIG. 1, the beverage production apparatus 1 can further comprise a current sensor 13, which is preferably connected to the motor 41 of the dosing unit 4. The current sensor 13 is configured to measure an operating current of the motor 41. As described above, the dosing unit 4 can be designed such that the motor 41 not only activates the dosing unit 4, but also indirectly translates the mixing chamber 21 between its mixing position and its dosing position. Thereby, the mixing chamber 21 is moved while being supported by the slider 22b in respect to the fixed upper part 22a, preferably guided by rims and grooves. The rims and grooves can be blocked by residues or other deposits. If this is the case, the motor 41 will have to exert a stronger force to move the slider 22b and the mixing chamber 21. That means the required current exceeds its nominal value. Therefore, the current sensor 13 is preferably configured to compare the operating current of the motor 51 with a predetermined threshold value. In case the current exceeds the predetermined threshold value, the current sensing device 13 is configured to interpret the exceeding current as a sign that blocking residues are present inside the beverage preparation apparatus 1. In this case, the current sensing unit 13 can provide a signal to a warning unit 14, which then can issue a warning signal, preferably alerting lights that can be perceived by the user.

The method of measuring the current of the motor 41 during operation of the beverage production apparatus 1 prevents that the movement of the slider 22b against the upper part 22a, and thus the movement of the mixing chamber 21 between the dosing position and the mixing position becomes blocked and the beverage production apparatus 1 has to be returned to maintenance.

In summary, the present invention describes a beverage mixing unit 2 and a beverage production apparatus 1 comprising said beverage mixing unit 2. The beverage mixing unit 2 is designed such that all parts in contact with the soluble beverage ingredients or the liquid can be removed from the beverage production apparatus 1 for cleaning. In particular, the beverage mixing unit 2 comprises a chamber receiving area 22, of which parts that can be dirtied can be removed from the beverage production apparatus 1. Further, the beverage mixing unit 2 comprises a mixing chamber 21, which can be selectively inserted into or removed from the chamber receiving area 22. Thereby, the cleaning of the beverage production apparatus 1 is simplified.

The invention is claimed as follows:

1. A beverage production apparatus comprising:
a chamber receiving area comprising an upper part; and
a mixing chamber configured to be selectively inserted into and removed from the chamber receiving area, the mixing chamber is positioned in the beverage production apparatus by insertion of the mixing chamber into the chamber receiving area, and the insertion of the mixing chamber into the chamber receiving area directs the mixing chamber into a position in which the upper part of the chamber receiving area extends above and around a top opening of the mixing chamber, the upper part comprises a top surface that is at least partly downwardly tilted toward an opening of the mixing chamber and facing the opening of the mixing chamber upon the insertion of the mixing chamber into the interior of the chamber receiving area.

2. The beverage production apparatus of claim 1, wherein the upper part is removable from the beverage production apparatus.

3. The beverage production apparatus of claim 1, wherein the insertion of the mixing chamber into the chamber receiving area directs the mixing chamber into a position surrounded by the chamber receiving area.

4. The beverage production apparatus of claim 1, wherein the upper part comprises an insertion member configured to insert into the beverage production apparatus.

5. The beverage production apparatus of claim 4, wherein the insertion member comprises rims configured to slide within grooves inside the beverage production apparatus.

6. The beverage production apparatus of claim 1, wherein the chamber receiving area comprises a slider comprising a receiver configured to receive the mixing chamber.

7. The beverage production apparatus of claim 6, further comprising a lever configured to lock the mixing chamber in the slider.

8. The beverage production apparatus of claim 6, wherein the upper part and the slider comprise rims and grooves configured to slide the slider with respect to the upper part.

9. The beverage production apparatus of claim 6, wherein the receiver comprises grooves configured to slidably receive rims provided on the mixing chamber.

10. The beverage production apparatus according to claim 6, further comprising:
a motor configured to move the slider;
a current sensor configured to measure a current of the motor and compare the measured current with a predetermined threshold value; and
a light that can be activated to be perceived by the user and is configured to issue a warning signal when the measured current exceeds the predetermined threshold value.

11. The beverage production apparatus of claim 6, wherein the slider comprises a diluent inlet that cooperates with a diluent inlet of the mixing chamber.

12. The beverage production apparatus of claim 11, further comprising a liquid reservoir and a pump configured to transport diluent from the liquid reservoir to a heater and then to the diluent inlet of the mixing chamber.

13. The beverage production apparatus of claim 6, further comprising a dosing unit configured to deliver a dose of a soluble beverage ingredient from an ingredient container into the mixing chamber.

14. The beverage production apparatus of claim 13, wherein the slider is configured to move the mixing chamber from a mixing position into a dosing position, a distance from the dosing unit to the mixing chamber in the mixing position is greater than a distance from the dosing unit to the mixing chamber in the dosing position.

15. The beverage production apparatus of claim 13, wherein the dosing unit comprises a gear wheel configured to act on a connecting rod that connects the gear wheel and the slider to translate rotation of the gear wheel into a translational relative movement of the slider in respect to the upper part.

16. The beverage production apparatus according to claim 13, further comprising:
a motor configured to operate the dosing unit;
a current sensor configured to measure a current of the motor and compare the measured current with a predetermined threshold value; and
a light that can be activated to be perceived by the user and is configured to issue a warning signal when the measured current exceeds the predetermined threshold value.

17. The beverage production apparatus of claim 13, further comprising a soluble ingredient reservoir placed above the chamber receiving area and coupled with the dosing unit.

18. The beverage production apparatus of claim 1, wherein the insertion of the mixing chamber into the chamber receiving area places the mixing chamber directly above a service tray configured to support a receptacle to receive a beverage from the mixing chamber.

19. The beverage production apparatus of claim 1, wherein bottoms of lateral sides of the upper part of the chamber receiving area define a surface that is smaller than a top surface of the mixing chamber.

* * * * *